United States Patent
Williams et al.

[19]

[11] Patent Number: 5,771,650
[45] Date of Patent: Jun. 30, 1998

[54] INTERLOCKING BUILDING BLOCK SYSTEM

[75] Inventors: Stephen J. Williams; Kristi L. Williams, both of Peoria, Ill.

[73] Assignee: Kingswood, Inc., Peoria, Ill.

[21] Appl. No.: 818,719

[22] Filed: Mar. 14, 1997

[51] Int. Cl.$^6$ .............................. G09B 25/04; E04C 1/00; E04B 1/38

[52] U.S. Cl. ............................ 52/568; 403/292; 403/298; 446/122; 24/578; 52/585.1; 52/604; 52/698

[58] Field of Search .................................. 52/604, 585.1, 52/582.1, 568, 565, 564, 698, 704; 24/578; 403/292, 297, 298; 446/122

[56] References Cited

U.S. PATENT DOCUMENTS

| | | |
|---|---|---|
| 604,708 | 5/1898 | Burton . |
| 2,877,506 | 3/1959 | Almoslino . |
| 3,527,486 | 9/1970 | Gamo .................................. 403/298 X |
| 3,609,926 | 10/1971 | Muse ..................................... 52/604 X |
| 3,883,258 | 5/1975 | Hewson .................................. 403/298 |
| 3,966,339 | 6/1976 | Nemecek et al. ....................... 403/292 |
| 4,454,699 | 6/1984 | Strobl ..................................... 52/585.1 |
| 4,602,908 | 7/1986 | Kroeber . |
| 4,731,041 | 3/1988 | Ziegler . |
| 4,919,268 | 4/1990 | Young et al. . |

*Primary Examiner*—Robert Canfield
*Attorney, Agent, or Firm*—Cushman, Darby & Cushman Intellectual Property Group of Pillsbury Madison & Sutro LLP

[57] ABSTRACT

A set of building blocks useful for constructing model structures includes a plurality of building blocks comprising block bodies and block interconnecting structure. The block interconnecting structure releasably locks each block to one or more adjacent blocks by resisting the blocks being pulled apart from each other. The interconnecting structure does provide, however, a limited amount of lateral play between the blocks so that the interconnected blocks may be moved laterally with respect to each other. The interconnecting structure preferably comprises one or more connecting elements installed into respective apertures in the block bodies. Some blocks have connecting elements with both an inserting end that projects above an outer surface of the block body and a receiving end disposed within the aperture. Other blocks have connecting elements having only a receiving end. The inserting end of the connecting element of a block is inserted into the receiving end of an adjacent block to which it is to be interconnected. The receiving end of a connecting element resists extraction of the inserting end inserted therein but permits the inserting end to move laterally a limited amount within the receiving end.

12 Claims, 4 Drawing Sheets

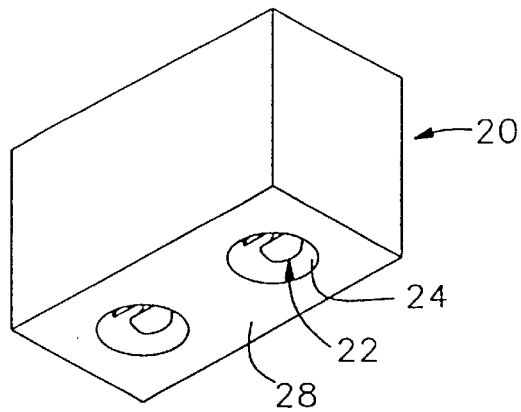
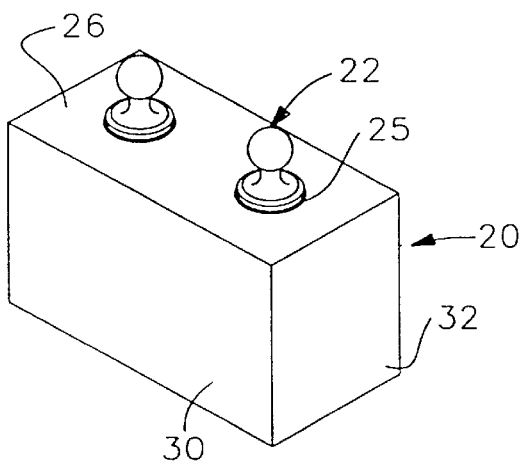
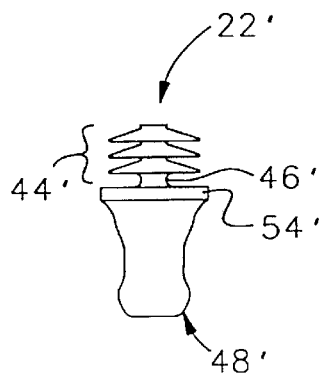
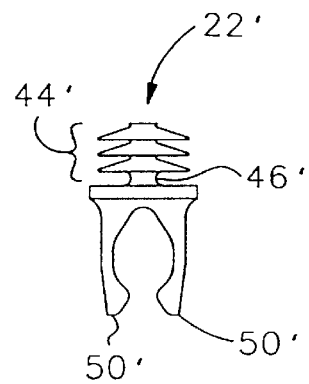
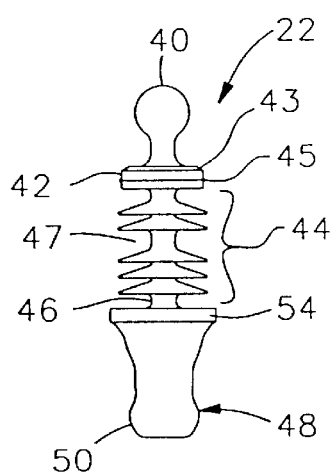
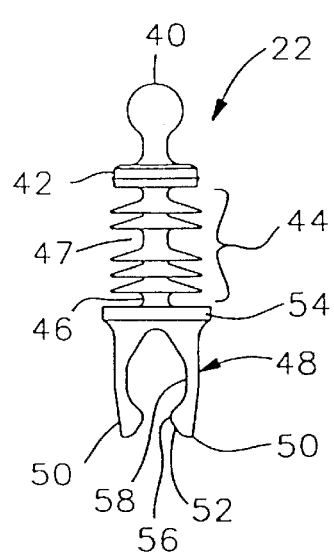

INTERLOCKING BUILDING BLOCK SYSTEM

FIELD OF THE INVENTION

The present invention relates to building blocks for constructing model structures wherein the individual building blocks interconnected by means of connecting elements which connect the blocks to one another yet permit limited lateral movement of the blocks with respect to each other so that a straight wall constructed of such blocks can be manipulated into a wall having curves.

BACKGROUND OF THE INVENTION

Typical building blocks for constructing model structures have a solid rectangular shape with flat, planar, mutually orthogonal outer surfaces. Some blocks are provided with interlocking or connecting structure for interconnecting a plurality of the blocks into a desired structural shape. Typical interconnecting structures positively lock the blocks to one another and permit no lateral movement, or play, of the blocks with respect to each other. Moreover, the blocks and associated interconnecting structures are configured such that flat top, bottom, and end surfaces of the blocks are in contact with top, bottom, and end flat surfaces of adjacent blocks. Accordingly, the structures which can be constructed with such blocks are limited to those having straight, vertical walls and 90 degree corners.

Further, because the interconnecting structures permit no lateral play between mutually interconnected blocks, a plurality of blocks, once assembled into a straight, vertical wall, cannot thereafter be manipulated into other curved and/or sloped walls. Curved and/or sloped walls can only be built using specially shaped blocks. Accordingly, the variety of model structures which can be constructed by such typical building blocks is necessarily limited.

Past proposals for providing curved wall capability have included trapezoidal or wedge-shaped blocks or combinations of straight and trapezoidal or wedge-shaped blocks.

On the other hand, rectangular building blocks having no interconnecting elements, i.e., those blocks wherein each block merely rests on the blocks below it and all blocks are held together by only gravity and friction, are capable of being arranged in curved patterns and non-orthogonal corners. Because such blocks lack interconnecting elements, however, structures built from such blocks are usually unstable and easily knocked down.

Accordingly, a need exists for building blocks that are interconnectable with each other yet may be manipulated after they are interconnected.

SUMMARY OF THE INVENTION

The present invention seeks to overcome the limitations presented by conventional building blocks. This object is achieved by providing a set of building blocks useful for constructing model structures, each of a plurality of the set comprising a block body and block interconnecting structure fixed to the block body. The block interconnecting structure is constructed and arranged to detachably connect the block body to a block body of an adjacent building block of the plurality of building blocks by resisting movement of the block body of the building block in a first direction with respect to the block body of the adjacent building block when the block interconnecting structure of the building block is connectively engaged with block interconnecting structure of the adjacent building block. The interconnecting structure is also constructed and arranged to permit limited play of the building block with respect to the adjacent building block in a second direction substantially transverse to the first direction when the interconnecting structure of the building block is connectively engaged with the interconnecting structure of the adjacent building block to enable interconnected building blocks of the plurality of building blocks to be manipulated.

Further, the object of the present invention is achieved by providing a connecting element for installation in a respective aperture in each of a plurality of building blocks useful for constructing model structures. The connecting element is constructed and arranged to enable a building block of the plurality of building blocks to be interconnected with an adjacent building block of the plurality of building blocks such that separation of the building block from the adjacent building block in a first direction is resisted by the connecting element while limited movement of the building block with respect to the adjacent building block in a second direction substantially transverse to the first direction is permitted by the connecting element. The connecting element includes connecting element retaining structure constructed and arranged to frictionally retain the connecting element in the aperture when the connecting element is installed in the aperture. An insert structure is disposed at one end of the connecting element and extends from the aperture when the connecting element is installed in the aperture. Insert receiving structure is disposed at an opposite end of the connecting element and is disposed within the aperture when the connecting element is installed in the aperture. The insert receiving structure of the connecting element of the building block is constructed and arranged to receive and releasably retain the insert structure of the connecting element of the adjacent building block when the insert structure of the adjacent building block is inserted into the insert receiving structure of the building block. Further, the insert structure and the insert receiving structure are constructed and arranged such that when the insert structure of the connecting element of the adjacent building block is inserted into the insert receiving structure of the connecting element of the building block, the insert receiving structure of the connecting element of the building block resists extraction in the first direction of the insert structure of the connecting element of the adjacent building block from the insert receiving structure of the connecting element of the building block. The insert structure and the insert receiving structure are further constructed and arranged to permit limited movement in the second direction of the insert structure of the connecting element of the adjacent building block within the insert receiving structure of the connecting element of the building block.

These and other features of the present invention will become more apparent during the course of the following detailed description and appended claims. The invention may best be understood with the reference to the accompanying drawings wherein an illustrative embodiment is shown.

BRIEF DESCRIPTION OF THE DRAWINGS

FIG. 1A is a perspective view from above of one embodiment of a building block according to the present invention;

FIG. 1B is a perspective view from below of the building block shown in FIG. 1A;

FIG. 2A is a front-view elevation of a preferred embodiment of a male-female building block connecting element according to the present invention;

FIG. 2B is an end-view elevation of the preferred embodiment of a male-female building block connecting element according to the present invention;

FIG. 3A is a front-view elevation of a preferred embodiment of a female only building block connecting element according to the present invention;

FIG. 3B is an end-view elevation of the preferred embodiment of a female only building block connecting element according to the present invention;

DETAILED DESCRIPTION OF THE PREFERRED EMBODIMENT

Figure 5:
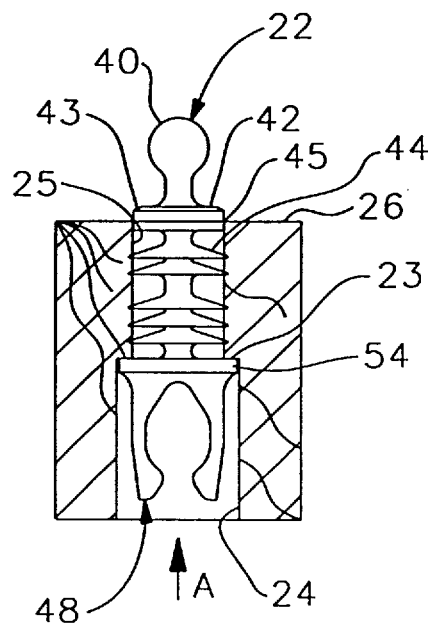
FIG. 5 is cross-section taken along the line V—V in FIG. 4A.

A building block according to the present invention is shown in FIGS. 1A, 1B, 4A, and 4B and is indicated generally by reference number 20. The block 20 shown is substantially rectangular, although it is presently contemplated that the present invention may be incorporated into blocks of substantially any shape as will be described below. The body of the block is preferably formed of wood (hard maple being preferred) but may be formed of other materials, such as plastic. Block 20 is provided with two connecting elements, such as, male-female locking inserts 22 inserted into the hole 24 formed in the bottom surface 28 and extending through hole 25 above top surface 26. Although block 20 is shown having two locking inserts 22, it will be appreciated that a building block according to the present invention could be provided with any number of locking inserts, i.e., more or less than two. In addition, although locking inserts 22 are shown projecting from surface 26, which, in the views depicted in FIGS. 1A and 1B, is the top of the block, locking inserts could project from any of the surfaces 30, 32, 34, or 28 in addition or alternatively to the locking inserts projecting from surface 26.

The details of the male-female locking insert 22 are shown in FIGS. 2A and 2B. Each male-female locking insert, preferably, but not exclusively, formed of molded plastic, includes a male end 40 and female end 48. In the preferred embodiment of the present invention, male end 40 comprises a spherical ball and female end 48 comprises a clip having two prongs 50. Each locking insert 22 includes an axially extending central shaft 46 and preferably further includes a circular rim 42 disposed along the central shaft 46 below the spherical ball 40 and centered on and extending radially from the central shaft 46. Rim 42 preferably has a diameter that is greater than that of the spherical ball of male end 40. Rim 42 preferably has a chamfer section 43 formed about the outer periphery of the upper surface of the rim 42 to facilitate installation of the insert into a block as will be described below. Rim 42 further preferably includes an indication mark 45 extending about the outer periphery of the rim 42. The purpose of indication mark 45 will be described below.

Located below the rim 42 is a plurality of radially extending circumferential fins 44. As can be appreciated from FIGS. 2A and 2B, each individual fin has a thickness that preferably varies linearly from a maximum thickness adjacent central shaft 46 to a minimum thickness at the radial extent of the fin. The fins 44 are preferably elastically deflectable and preferably deflect more readily toward the female end 48 of the locking insert than toward the male end 40. Although the locking inserts 22 shown in FIGS. 2A and 2B include five radial fins, a locking insert may have any number of radially extending fins, although a minimum of three fins is preferred.

In the preferred embodiment of the present invention, the plurality of radial fins is preferably divided into an upper group of fins and a lower group of fins separated from one another by gap 47. The purpose of gap 47 will be described below.

Located below the plurality of radially extending fins 44, is shoulder 54 centered on and extending radially from central shaft 46. Shoulder 54 is preferably circular and preferably has a diameter greater than that of the plurality of radially extending fins 44.

Located below shoulder 54 is the female end 48 which preferably comprises a clip structure composed of two diametrically opposed prongs 50. Each prong 50 includes a bevelled section 52 at the inner surface of the lower axial end of the prong 50, a retaining flange 56, and a ball holding area 58. The operation and function of the male-female locking insert 22 will be described below.

The installation of each locking insert into a block is shown in FIG. 5. As shown in FIG. 5, each locking insert 22 is installed into a through hole formed through the block which comprises a first portion 24 and a second portion 25. Portion 24 has a greater diameter than that of portion 25, and a radially extending, annular shoulder 23 is defined at the junction of portion 24 with portion 25. The locking insert 22 is inserted into the through hole in the direction indicated by arrow A shown in FIG. 5. As can be appreciated from FIG. 5, the diameter of portion 24 is preferably slightly larger than the diameter of shoulder 54 of the locking insert 22 so that shoulder 54 readily fits within hole portion 24, and the diameter of the radially extending fins 44 is preferably slightly larger than that of portion 25 of the through hole so that fins 44 deflect slightly and fit snugly within hole portion 25. Locking insert 22 is inserted into the through hole until shoulder 54 engages the annular shoulder 23. Chamfer section 43 eases the insertion of the insert into the hole portion 25. As can be appreciated from FIG. 5, the length of portion 24 of the through hole should be such that when insert 22 is installed in the through hole with shoulder 54 abutting annular shoulder 23, the bottom end of female end 48 is recessed within the hole 24. Also, the length of the locking insert between shoulder 54 and rim 42 (and the length of hole portion 25) should be such that indication mark 45 is disposed at the upper edge of hole portion 25 and a portion of the thickness of rim 42 extends above surface 26. Accordingly, indication mark 45 is preferably provided as a system control measure to ensure that hole portion 24 is drilled to a proper depth.

With shoulder 54 abutting the annular shoulder 23, locking insert 22 can move no further in the direction indicated by arrow A. In addition, because the radially extending fins 44 deflect more easily toward the female end 48 of insert 22 than toward the male end 40 and are slightly deflected toward female end 48 from the insertion of insert 22 into hole portion 25, the radially extending fins 44 resist movement of the locking insert in a direction opposite to that indicated by arrow A. Accordingly, locking insert 22 is substantially fixed into the installed position shown in FIG. 5.

Figure 8:
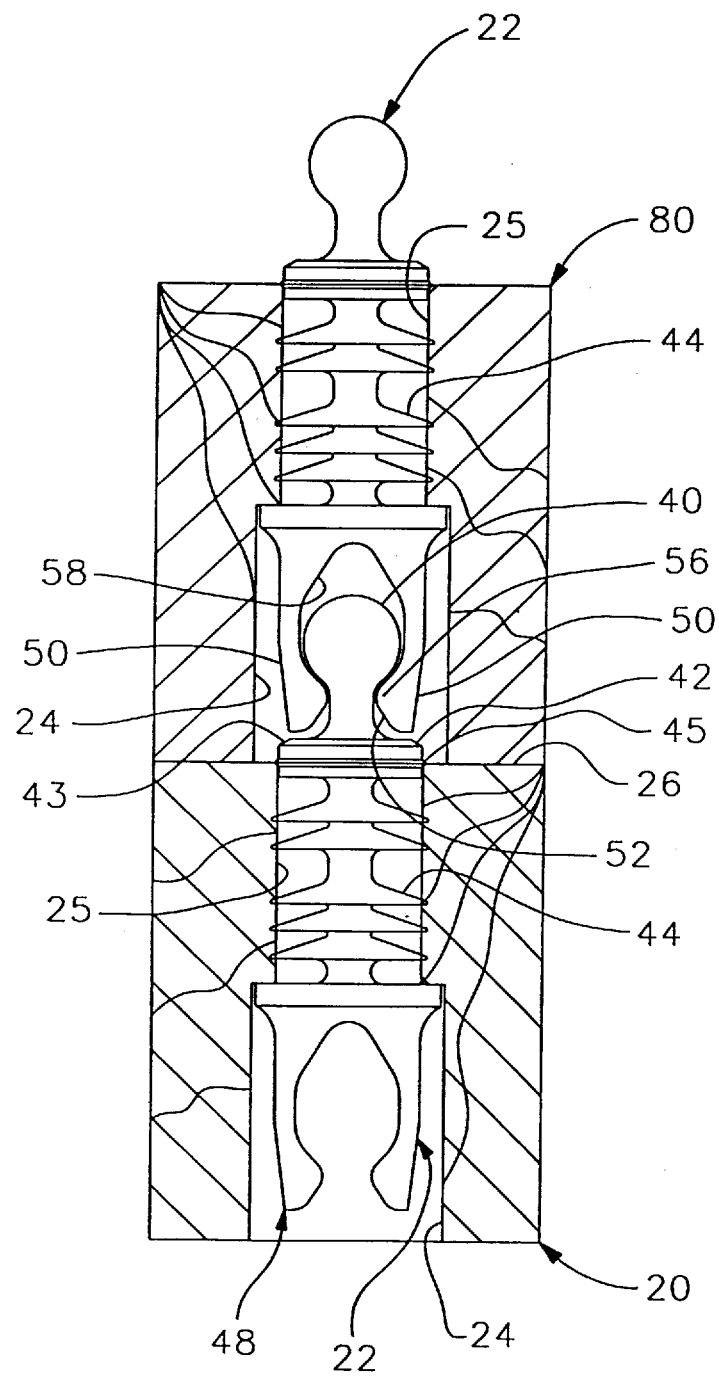
FIG. 8 is an end-view cross section of two building blocks interconnected to each other in accordance with the present invention.

Interconnection of building blocks according to the present invention to one another will be described with reference to FIG. 8. Shown in FIG. 8 are two blocks 20 and 80 interconnected to one another. Because the locking inserts of both blocks are preferably identical to one another in structure, common reference numbers will be employed for common structural features of the inserts of both blocks 20 and 80. As shown in FIG. 8, a first block 20 is interconnected to a second block 80 by inserting the male end 40 of insert 22 protruding above block 20 into the female end 48 of the locking insert 22 of the block 80. Prongs 50 are preferably shaped so as to facilitate insertion of the male end ball 40 into the female end clip 48. Specifically, bevelled sections 52 formed in the lower end of prongs 50 cause the prongs 50 to deflect away from each other as the ball 40 is forced into clip 48. As mentioned above, the inserts 22 are preferably formed from plastic. Therefore, deflection of the prongs 50 is elastic deflection. Once ball 40 is inserted all the way into the ball holding area 58, the prongs 50 return to their normal positions and withdrawal of the ball 40 from the clip 48 is resisted by retaining flanges 56.

With the blocks interlocked as shown in FIG. 8, separation of the blocks in an axial direction with respect to the locking inserts 22 is resisted by the female end clip 48 holding the male end ball 40. In addition, the prongs 50 of the clip 48 resist movement of the ball 40 of block 20 in a lateral direction with respect to block 80 (i.e., left or right as shown in FIG. 8). However, limited movement or play of block 20 with respect to block 80 is available in a direction into and out of the page of FIG. 8. The amount of linear play is limited by the portion of rim 42 extending above the top surface 26 of block 20. This portion of rim 42 extending above block 20 engages with the outer periphery of portion 24 of the through hole of 80 so as to limit movement of blocks 20 and 80 with respect to one another. As can be appreciated from FIG. 8, the diameter of rim 42 is less than that of portion 24 of the through hole. It is preferred that the diameter of rim 42 be approximately ⅛ inch less than the diameter of hole portion 24 so as to permit approximately ¹⁄₁₆ inch of play in either direction.

Figure 9A:
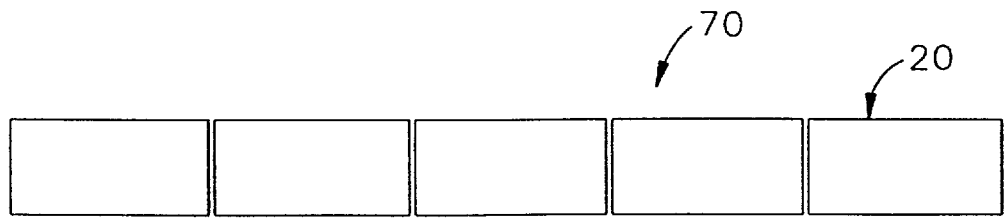
FIG. 9A is a top view of one row of a plurality of building blocks according to the present invention oriented in a straight wall configuration.
Figure 9B:
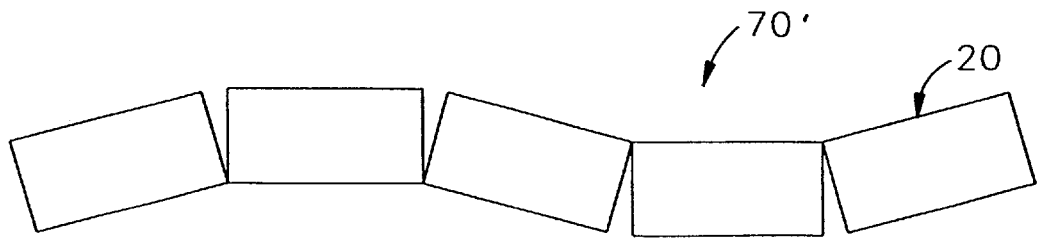
FIG. 9B is a top view of the one row of building blocks of FIG. 9A manipulated in accordance with the present invention into a curved wall configuration.

The manner in which the above-described interblock play permits a plurality of blocks interconnected in accordance with the present invention to be manipulated is shown in FIGS. 9A and 9B. A top view of at least a portion 70 of one row of building blocks 20 is shown. For simplicity, the row of blocks below row 70 with which the blocks of row 70 would be interconnected is not shown. As shown in FIG. 9A, when initially interconnected, row 70 may assume a straight configuration, the end of each block 20 being substantially parallel to the end of the adjacent block and there being little or no space between the ends of adjacent building blocks. Row 70 can be manipulated, however, by merely moving desired portions of row 70 in different transverse directions to create a curved row 70' as shown in FIG. 9B. The interblock play permits the ends of adjacent blocks to become partially separated and to allow some degree of rotation of the blocks so that the ends may assume non-parallel orientations with respect to each other. Accordingly straight walls can be manipulated into curved walls and vice versa.

It is not necessary, however, that a wall first be constructed in a straight-walled orientation and then manipulated into a desired curved orientation. A wall may be constructed in a curved orientation, limited only by the amount of play permitted by the connecting elements.

It can also be appreciated from FIG. 8 that if only one insert from block 20 is engaged with one insert of block 80, blocks 80 and 20 will be rotatable with respect to each other about the aligned longitudinal axes of their respective inserts.

When the locking insert 22 is installed into a block, the insert should be oriented such that the prongs 50 are disposed perpendicularly with respect to the direction in which the linear play is desired. In other words, the open area extending between the prongs 50 must be aligned with the desired direction of linear play. In addition, when more than one locking insert is provided in a block, each of the inserts should be oriented consistently with the desired direction of play.

To disengage blocks from one another, interconnected blocks are merely pulled apart in a direction roughly parallel to the axial direction of the connecting elements, or inserts. Prongs 50 will be caused to bend elastically outwardly by ball 40 so as to release ball 40 from the female end of the insert.

Figure 6:
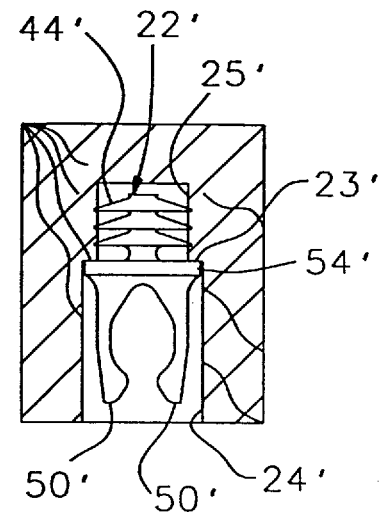
FIG. 6 is a cross-section showing a female only building block connecting element taken in a direction corresponding to the direction of the cross-section of FIG. 5.
Figure 4A:
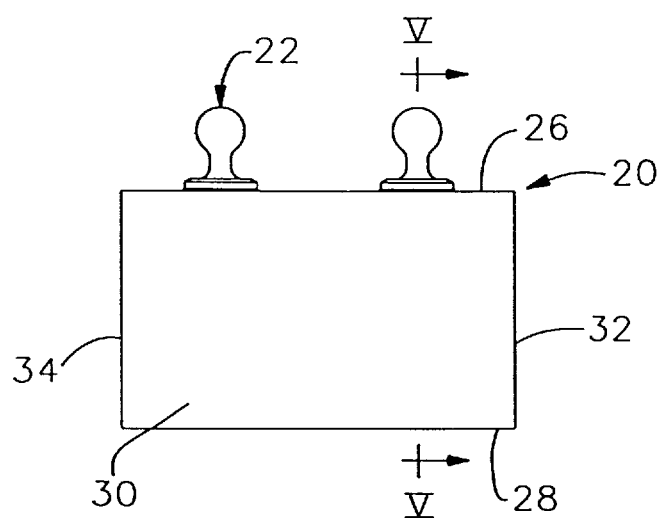
FIG. 4A is a front-view elevation of one embodiment of a building block according to the present invention.
Figure 4B:
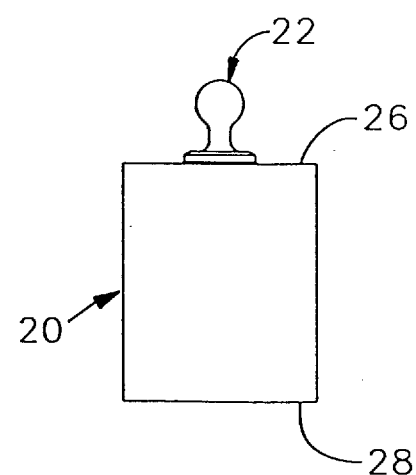
FIG. 4B is an end-view elevation of one embodiment of a building block according to the present invention.

The block and locking insert configurations described thus far comprise a block having a locking insert with both a male end 40 and female end 48. When a wall structure is constructed of blocks according the present invention, the aesthetics of the structure will be enhanced if there are no locking inserts protruding from the top surface of the top row of blocks of the wall. Accordingly, a set of blocks according to the present invention will preferably include a plurality of blocks having a truncated, or female only, connecting element, or locking insert 22' as shown in FIGS. 3A, 3B and 6. Inserts 22' include a female end 48' which preferably comprises a clip having two diametrically opposed prongs 50' as with the male-female locking insert 22. In addition, inserts 22' include a shoulder 54', a central shaft 46' and a plurality of radially extending fins 44'. As opposed to the male-female locking inserts 22 shown in FIGS. 2A and 2B, however, the female locking insert 22' as shown in FIGS. 3A and 3B does not include a rim 42 or a male end ball 40.

Female only inserts 22' are preferably formed by cutting a male-female insert 22 at gap 47 into two portions. The upper, male end, portion may be discarded and the lower, female end, portion becomes a female only insert. Accordingly, both male-female and female only inserts can be produced using a single injection mold. It is, of course, possible to form each type of insert in specifically designed mold, in which case there is no need for gap 47 formed in the male-female insert. As shown in FIG. 6, the female locking insert 22' is installed into a block much as a male-female locking insert 22 is installed. Specifically, the insert 22' is inserted into a blind hole which comprises a first portion 24' and a second portion 25' having a diameter less than that of first portion 24'. Again, the diameter of first portion 24' is preferably such that shoulder 54' readily fits into first portion 24' and the diameter of second portion 25' is preferably such that radial fins 44' fit snugly within second portion 25'. Insert 22' is inserted into the blind hole until shoulder 54' engages the annular shoulder 23' defined at the junction of first portion 24' and second portion 25'.

Figure 7B:
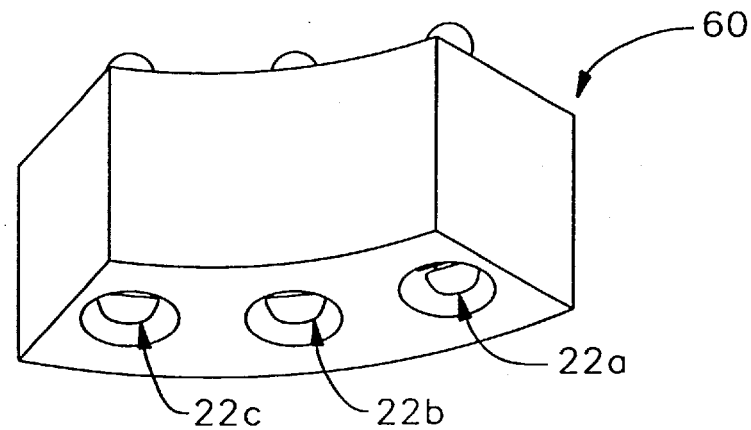
FIG. 7B is a perspective view from below of the building block shown in FIG. 7A.
Figure 7A:
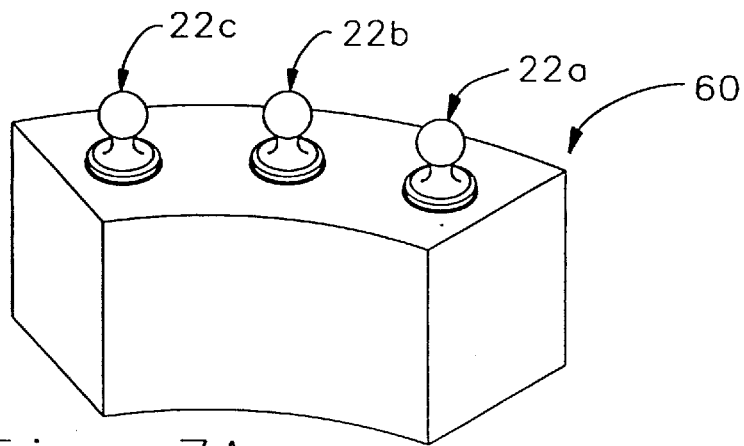
FIG. 7A is a perspective view from above of a second embodiment of a building block according to the present invention.

As mentioned above, interlocking blocks according to the present invention can take on a practically limitless variety of shapes and sizes. One example of an alternate shape is shown in FIGS. 7A and 7B. Block 60 has an arcuate shape and has three locking inserts 22*a*, 22*b*, and 22*c*. Each of the locking inserts 22*a*–22*c* is preferably oriented such that the female clip portions thereof are aligned in the arcuate direction defining the block 60.

Other block shapes which can incorporate an interlocking mechanism of the present invention may include arches and a variety of other shapes.

A set of building blocks incorporating the present invention need not include only building blocks having interblock lateral play in accordance with the present invention, but may also include, for example, blocks that are not interconnectable at all with neighboring blocks and blocks that are rigidly interconnectable to neighboring blocks, that is to say, blocks without interblock play capability.

Any number of model structures can be built with a set of building blocks according to the present invention; the user's imagination being the limit.

Such model structures may include anything from simple four-sided houses to elaborate castles, bridges, and towers. To that end, a set of building blocks may include any number of specialty blocks having unique shapes, or add-on sets having specialty blocks for specific types of structures could be sold as accessories to basic building block sets. For example, a castle set may include numerous arches of different spans and radii of curvatures for constructing gates and windows, arcuate blocks for constructing towers, special blocks for constructing spiral staircases in one or more towers, and assorted crowning pieces for constructing wall and tower crowns.

It will be realized that the foregoing preferred specific embodiment of the present invention has been shown and described for the purposes of illustrating the functional and instructional principles of this invention and are subject to change without departure from such principles. Therefore, this invention includes all modifications encompassed within the spirit and scope of the following claims.

What is claimed is:

1. A set of building blocks useful for constructing model structures, each of a plurality of said set comprising:

a block body having a planar surface; and block interconnecting structure fixed to said block body for detachably connecting said block body to a block body of an adjacent building block of said plurality of building blocks whereby said planar surface of said block body is in contact with a planar surface of the block body of said adjacent building block, said block interconnecting structure being constructed and arranged to resist movement of said block body of said building block in a first direction with respect to said block body of said adjacent building block when said block interconnecting structure of said building block is connectively engaged with block interconnecting structure of said adjacent building block to substantially maintain contact between the planar surfaces of said block body and said adjacent block body and to permit limited play of said building block with respect to said adjacent building block in a second direction substantially transverse to said first direction and substantially parallel to said planar surface when said interconnecting structure of said building block is connectively engaged with said interconnecting structure of said adjacent building blocks of said plurality of building blocks to be manipulated.

2. The set of building blocks of claim 1 wherein said block interconnecting structure of each of said plurality of building blocks comprises a connecting element inserted in an aperture formed in each block body, said connecting element comprising:

connecting element retaining structure constructed and arranged to frictionally retain said connecting element in said aperture when said connecting element is installed in said aperture;

an insert structure disposed at one end of said connecting element and extending from said aperture when said connecting element is installed in said aperture; and insert receiving structure disposed at an opposite end of said connecting element and disposed within said aperture when said connecting element is installed in said aperture, said insert receiving structure of each building block being constructed and arranged to receive and releasably retain said insert structure of said connecting element of said adjacent building block when said insert structure of said adjacent block is inserted into said insert receiving structure, said insert structure and said insert receiving structure being constructed and arranged such that when said insert structure of said connecting element of said adjacent building block is inserted into said insert receiving structure of said connecting element of said building block, said insert receiving structure of said connecting element of said building block resists extraction in said first direction of said insert structure of said connecting element of said adjacent building block from said insert receiving structure of said connecting element of said building block, said insert structure and said insert receiving structure being further constructed and arranged to permit limited movement in said second direction of said insert structure of said connecting element of said adjacent building block within said insert receiving structure of said connecting element of said building block.

3. The set of building blocks of claim 1 wherein said interconnecting structure of each of a first portion of said plurality of building blocks comprises a male-female connecting element installed in a hole formed in each block body of said first portion of said plurality of building blocks, and said interconnecting structure of each of a second portion of said plurality of building blocks comprises a female only connecting element installed in a hole formed in each block body of said second portion of said plurality of building blocks, each of said male-female and female only connecting elements comprising:

connecting element retaining structure constructed and arranged to frictionally retain said connecting element in said hole when said connecting element is installed in said hole; and insert receiving structure disposed at an end of said connecting element and disposed within said hole when said connecting element is installed in said hole, each said male-female connecting element further comprising an insert structure disposed at an end of said male-female connecting element opposite said insert receiving structure and extending from said hole when said connecting element is installed in said hole, said insert receiving structure of said male-female and said female only connecting elements being constructed and arranged to receive and releasably retain said insert structure of said male-female connecting element of said adjacent building block when said insert structure of said adjacent block is inserted into said insert receiving structure, said insert structure and said insert receiving structure being constructed and arranged such that when said insert structure of said male-female connecting element of a building block of said first portion of said plurality of building blocks is inserted into said insert receiving structure of said male-female connecting element of an adjacent building block of said first portion of said plurality of building blocks or into said insert receiving structure of said female only connecting element of an adjacent building block of said second portion of said plurality of building blocks, said insert receiving structure of said adjacent building block resists extraction in said first direction of said insert structure of said male-female connecting element of said building block from said insert receiving structure of said adjacent building block, said insert structure and said insert receiving structure being further constructed and arranged to permit limited movement in said second direction of said insert structure of said male-female connecting element of said building block within said insert receiving structure of said male-female connecting element or said female only connecting element of said adjacent building block.

4. The set of building blocks of claim 2, said aperture formed in each of said plurality of building blocks including a first portion and a second portion having a diameter less than the diameter of said first portion, an annular, radially extending shoulder being defined at a junction of said first portion and said second portion, said connecting element of each of said plurality of building blocks including a central axial shaft along an extent of said connecting element, said connecting element retaining structure comprising a plurality of circular fins extending radially from said central axial shaft, each of said plurality of fins having a diameter such that said plurality of fins fit snugly within said second portion of said aperture when said connecting element is installed in said aperture, said insert structure comprising a spherical element fixed to one end of said central axial shaft and extending beyond an outer surface of said block body when said connecting element is installed in said aperture of said block body, said connecting element including a circular rim centered on and extending radially from said central axial shaft and disposed adjacent said spherical element, said circular rim having an axial thickness and further having a diameter no larger than the diameter of said second portion of said aperture, a portion of said axial thickness of said circular rim extending above said outer surface of said block body when said connecting element is installed in said aperture of said block body, said connecting element including a circular shoulder structure fixed to an opposite end of said axial shaft such that said plurality of fins is disposed between said rim and said circular shoulder structure, said circular shoulder structure being centered on and extending radially from said axial central shaft and having a diameter no greater than the diameter of said first portion of said aperture, said circular shoulder structure abutting said annular shoulder when said connecting element is installed in said aperture of said block body, and said insert receiving structure comprising a clip having two diametrically opposed prongs extending axially away from said circular shoulder structure, said clip being disposed within said first portion of said aperture when said connecting element is installed in said aperture of said block body.

5. The set of building blocks of claim 1, wherein said block body of each of said plurality of building blocks is composed of wood.

6. The set of building blocks of claim 2, wherein said connecting element of each of said plurality of building blocks is comprised of molded plastic.

7. The set of building blocks of claim 2, wherein each building block of said plurality of building blocks has more than one connecting element, each of said more than one connecting element being installed in a respective aperture formed in said block body.

8. The set of building blocks of claim 1, wherein said block body of at least a portion of said plurality of building blocks is substantially rectangular.

9. The set of building blocks of claim 1, wherein said block body of at least a portion of said plurality of building blocks is arcuate shaped.

10. The set of building blocks of claim 7 wherein each insert structure of each of said more than one connecting element protrudes from a common outer surface of said building block.

11. A connecting element for installation in a respective aperture in each of a plurality of building blocks useful for constructing model structures, said connecting element being constructed and arranged to enable a building block of the plurality of building blocks to be interconnected with an adjacent building block of the plurality of building blocks such that separation of the building block from the adjacent building block in a first direction is resisted by said connecting element while limited movement of the building block with respect to the adjacent building block in a second direction substantially transverse to said first direction is permitted by said connecting element, said connecting element comprising:

connecting element retaining structure constructed and arranged to frictionally retain said connecting element in the aperture when said connecting element is installed in the aperture;

an insert structure disposed at one end of said connecting element and extending from the aperture when said connecting element is installed in the aperture; and insert receiving structure disposed at an opposite end of said connecting element and disposed within the aperture when said connecting element is installed in the aperture, said insert receiving structure of said connecting element of the building block being constructed and arranged to receive and releasably retain said insert structure of said connecting element of the adjacent building block when said insert structure of the adjacent building block is inserted into said insert receiving structure of the building block, said insert structure and said insert receiving structure being constructed and arranged such that when said insert structure of said connecting element of the adjacent building block is inserted into said insert receiving structure of said connecting element of the building block, said insert receiving structure of said connecting element of the building block resists extraction in said first direction of said insert structure of said connecting element of the adjacent building block from said insert receiving structure of said connecting element of the building block, said insert structure and said insert receiving structure being further constructed and arranged to permit limited movement in said second direction of said insert structure of said connecting element of the adjacent building block within said insert receiving structure of said connecting element of the building block.

12. The connecting element of claim 11, said connecting element of each of the plurality of building blocks including a central axial shaft along an extent of said connecting element, said connecting element retaining structure comprising a plurality of circular fins extending radially from said central axial shaft, each of said plurality of fins having a diameter such that said plurality of fins fit snugly within a first portion of the aperture when said connecting element is installed in the aperture, said insert structure comprising a spherical element fixed to one end of said central axial shaft and extending beyond an outer surface of the building block when said connecting element is installed in the aperture of the building block, said connecting element including a circular rim centered on and extending radially from said central axial shaft and disposed adjacent said spherical element, said circular rim having an axial thickness and further having a diameter no larger than the diameter of the first portion of the aperture, a portion of said axial thickness of said circular rim extending above the outer surface of the building block when said connecting element is installed in the aperture of the building block, said connecting element including a circular shoulder structure fixed to an opposite end of said axial shaft such that said plurality of fins is disposed between said rim and said circular shoulder structure, said circular shoulder structure being centered on and extending radially from said axial central shaft and having a diameter no greater than a diameter of a second portion of the aperture having a diameter greater than the first portion of the aperture, said circular shoulder structure abutting a radially extending, annular shoulder defined at a junction of the first portion of the aperture and the second portion of the aperture when said connecting element is installed in the aperture of the building block, and said insert receiving structure comprising a clip having two diametrically opposed prongs extending axially away from said circular shoulder structure, said clip being disposed within the second portion of the aperture when said connecting element is installed in the aperture of the building block.

\* \* \* \* \*